(12) United States Patent
Sun et al.

(10) Patent No.: US 7,788,711 B1
(45) Date of Patent: *Aug. 31, 2010

(54) METHOD AND SYSTEM FOR TRANSFERRING IDENTITY ASSERTION INFORMATION BETWEEN TRUSTED PARTNER SITES IN A NETWORK USING ARTIFACTS

(75) Inventors: Wei Sun, Los Altos, CA (US);
Aravindan Ranganathan, San Jose, CA (US); Ping Luo, Union City, CA (US);
Qingwen Cheng, Fremont, CA (US);
Shivaram Bhat, Sunnyvale, CA (US);
Hong Xu, Palo Alto, CA (US); Bhavna Bhatnagar, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 1360 days.

This patent is subject to a terminal disclaimer.

(21) Appl. No.: 10/683,728

(22) Filed: Oct. 9, 2003

(51) Int. Cl.
*G06F 7/04* (2006.01)
(52) U.S. Cl. .................. 726/8; 726/3; 726/4; 726/5; 713/170; 709/223; 709/227; 709/229
(58) Field of Classification Search .................. 709/219, 709/225; 726/10
See application file for complete search history.

(56) References Cited

U.S. PATENT DOCUMENTS

| | | | | |
|---|---|---|---|---|
| 6,981,043 | B2 * | 12/2005 | Botz et al. .................. 709/225 |
| 7,010,582 | B1 * | 3/2006 | Cheng et al. ................. 709/219 |
| 7,627,532 | B2 * | 12/2009 | Randle et al. ................. 705/65 |
| 2003/0177388 | A1 * | 9/2003 | Botz et al. .................. 713/201 |

* cited by examiner

*Primary Examiner*—Pramila Parthasarathy
(74) *Attorney, Agent, or Firm*—Osha • Liang LLP

(57) ABSTRACT

A method for managing access to multiple applications using a central server. The method includes receiving a user name and password from an application for a user, generating identity assertion information using the user name and password, generating an artifact associated with the identity assertion information, sending the artifact to the application, receiving the artifact and a request for the identity assertion information from a second application, verifying the validity of the artifact, and sending the identity assertion information to the second application. The second application uses the identity assertion information to authorize the user to access the second application.

21 Claims, 8 Drawing Sheets

METHOD AND SYSTEM FOR TRANSFERRING IDENTITY ASSERTION INFORMATION BETWEEN TRUSTED PARTNER SITES IN A NETWORK USING ARTIFACTS

BACKGROUND OF THE INVENTION

1. Field of the Invention

Embodiments of the present invention relate to the field of network communications. More particularly, embodiments of the present invention relate generally to the transferring of information through the use of artifacts.

2. Related Art

As enterprises begin deploying electronic business (e-business) applications and services, costs for managing existing information technology systems are escalating. This is primarily due to an environment where identity information and security policies are distributed across many applications and repositories under the control of a variety of internal and external groups.

For example, an enterprise with affiliate business and customer relationships could potentially have user populations that reach into the tens or hundreds of millions. Management of access to information controlled by a single enterprise by its users and affiliated business users is typically deployed without a common identity management infrastructure. As such security and access decisions are often made in an ad hoc manner by developers and system administrators. As a result, unsecured access to tightly controlled information may occur, as it is uncertain that the right people see the right content at the right time.

In particular, controlled authorization for viewing certain web sites containing enterprise information can be restricted to different sets of users based on the role of the user. When roles change, changes to privileges should be propagated across all systems both internal and external to the enterprise. For example, when an employee changes departments or quits, information about that user should be modified or deleted across all accounts immediately. However, the lack of a consistent process for modifying privileges in a timely manner can result in a failure to modify the employee's access privileges and can create major security risks.

Moreover, access to the various affiliated businesses of an enterprise or branches within an enterprise without implementing a common identity infrastructure can be at the very least time consuming. A user wishing to conduct transactions with two or more affiliated businesses or branches within the enterprise must identify and authenticate itself with each of the affiliated businesses or branches. Time spent in repeatedly authenticating to various affiliated businesses can be better spent more productively. In addition, users tend to choose simple or easy to guess passwords and apply the same to different accounts rather than remember several passwords for the different accounts. This also leads to a breach in security.

As a result, scattered identity data, duplication of identity infrastructure functions across multiple applications, and ad hoc security all contribute to operational insecurities and inefficiencies across an enterprise and its affiliated business partners. As an enterprise and its affiliated business partners bring new applications and services online, each entity often creates a separate identity infrastructure for its applications and services. This duplication of effort increases costs, delays time to market, and reduces revenue.

SUMMARY OF THE INVENTION

Accordingly, various embodiments of the present invention disclose a method and system for transferring identity information between affiliated trusted partner sites of a network of trusted partner sites using artifacts. This facilitates a single sign-on capability for users accessing the network of affiliated trusted partner sites, instead of the user going through multiple sign-on procedures to communicate with various partner sites of the network of affiliated partner sites.

Specifically, embodiments of the present invention describe a method and system for transferring information between affiliated partners in a network. In one embodiment, a computer implemented method is disclosed for the transfer of identity information through the use of artifacts. A first trusted partner site of a network of trusted partner sites receives an artifact through a communication network. The first trusted partner site can use the artifact to authenticate a user associated with assertion information that is associated with the artifact.

Previously, assertion information and the artifact were generated when authenticating a user to a second trusted partner site. The second trusted partner site sends the artifact to the first trusted partner site via a central service provider that provides identity services for the network of trusted partner sites. The artifact is sent to the first trusted partner site from a second trusted partner site, or possibly a user of the network of trusted partner sites.

The artifact is associated with assertion information stored at the central service provider. For example, assertion information is associated with authorization and authentication data. The authentication data identifies users of the network of trusted partner sites, as well as each of the trusted partner sites in the network. The authorization information provides authorization for users to access the network of trusted partner sites. In other embodiments, the assertion information is data to be generated by one trusted partner site and sent to another trusted partner site in the network of trusted partner sites.

To retrieve the assertion information, the artifact is sent by the holder (e.g., the first trusted partner site) to the generator of the artifact (e.g., the central service provider) over the communication network. As such, the first trusted partner site sends a request to the central service provider with the artifact for artifact retrieval. The artifact forms the basis of a request for the assertion information. Thereafter, the central service provider processes the artifact along with the request. If the artifact and the request meet all the security measures, the assertion information is then sent to the requesting party, (e.g., the first trusted partner site). As such, the first trusted partner site receives the assertion information from the central service provider over the communication network in response to the artifact.

DETAILED DESCRIPTION OF THE INVENTION

Figure 1:
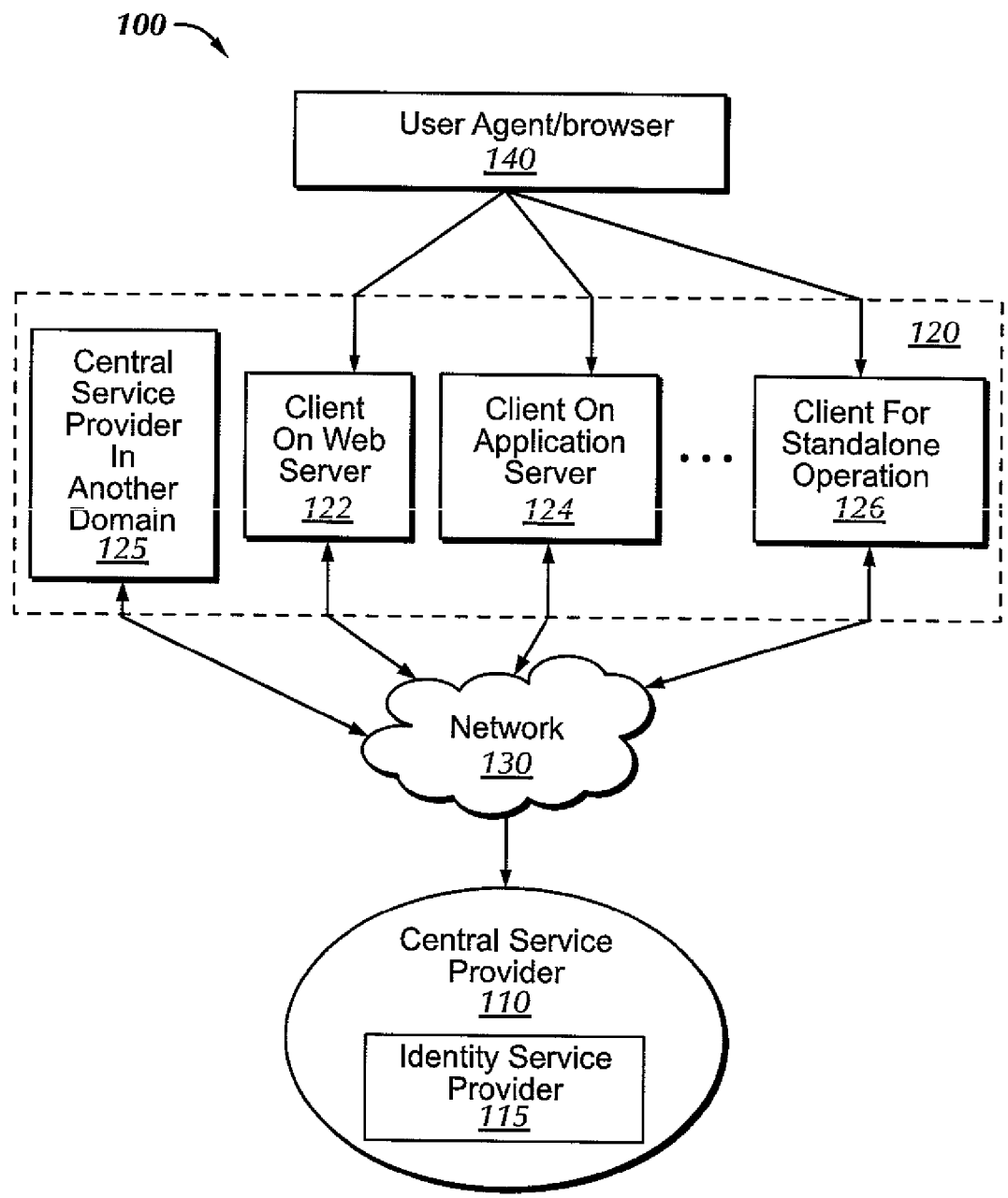
FIG. 1 is a block diagram of a communication network that supports the transfer of assertion information between trusted partner sites in a network of trusted partner sites using artifacts, in accordance with one embodiment of the present invention.

Reference will now be made in detail to the preferred embodiments of the present invention, a method and system of transferring information within a network of trusted partners using artifacts, examples of which are illustrated in the accompanying drawings.

Embodiments of the present invention can be implemented on software running on a computer system. The computer system can be an embedded system, a personal computer, notebook computer, server computer, mainframe, networked computer, handheld computer, personal digital assistant, workstation, and the like. This software program is operable for supporting the transfer of information within a network of trusted partner sites using artifacts. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "sending," "generating," "storing," "tagging," and "authenticating," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, various embodiments of the present invention disclose a method and system for transferring information within a network of trusted partner sites using artifacts. This facilitates a single sign-on capability for users accessing the network of trusted partner sites, instead of the user going through multiple sign-on procedures to communicate with various partner sites of the network of affiliated partner sites. Additionally, with a common identity infrastructure, information is more secure against unauthorized access by centralizing the creation and transfer of information within a network of trusted partner sites through a central service provider. Thus, the transfer of information within a network of trusted partner sites is accomplished more efficiently and more securely.

Referring now to FIG. 1, a block diagram of a communication system 100 is disclosed that is capable of supporting the transfer of information within a network 120 of trusted partner sites using artifacts, in accordance with one embodiment of the present invention. The present embodiment supports single sign-on capabilities for users of the network 120 of trusted partner sites.

The network 120 of trusted partner sites is comprised of various client entities that provide application services, for example. In FIG. 1, client 122 comprises a client on a web server, client 124 on an application server, on up to the n-th client 126, for standalone operation. The various clients 122, 124, and 126 comprise the network 120 of trusted partner sites.

Also, a central service provider 125 from another domain is located within the network 120 within one embodiment of the present invention. This central service provider 125 provides services to a different network of trusted partner sites. As such, through the central service provider 125, clients within the network 120 of trusted partner sites are able to communicate with those clients supported by the central service provider 125.

The client entities are affiliated entities that support a single sign-on capability for users of the network 120 of trusted partner sites. For example, the client entities can be affiliated branches of a particular corporation, such as, branches of a banking corporation.

In one embodiment, the client entities are affiliated business partners that work closely together during normal operations. For example, these various entities could comprise a bank, a travel agency, an airline, etc. As such, the network 120 of trusted partner sites have themselves formed the network 120 to facilitate the transfer of information within the network 120 of trusted partner sites.

In another embodiment, the client entities are defined by a user/browser 140 of the network 120 of trusted partner sites. Integrating those companies that the user/browser 140 typically communicates with on a frequent basis into a single network 120 of trusted partner sites facilitates a more efficient method of transferring information within the network 120, (e.g., sign-on information).

The network 120 of trusted partner sites is supported by a central service provider 110. In one embodiment, the central service provider 110 provides identity and authorization services, and comprises an identity service provider 115. In a single sign-on environment, a user would authenticate itself to the identity service provider 115. Thereafter, the identity service provider 115 generates identity assertion information to be provided to clients within the network 120 as directed by the user/browser 140. In that case, the clients would determine whether or not to communicate with the user/browser 140. In another case, the identity service provider 115 provides full authentication services. In that case, authorization assertion information is generated by the identity service provider 115 that indicates whether the user/browser 140 can access the entities in the network 120 of trusted partner sites.

By centralizing the services provided by the central service provider 110 of FIG. 1, including the identity service provider 115, the central service provider 110 can support one or more networks of trusted partner sites, in one embodiment. As such, central service provider 110 can support subsets of the network of trusted partner sites, such as, a user defined subset or network 120 of trusted partner sites.

The central service provider 110 is communicatively coupled to the network 120 of trusted partner sites through a network 130. The network 130 can be any communication network, such as a local area network, wide area network, Internet, etc. As such, each of the trusted partner sites can be located remotely from each other, but are still communicatively coupled to the central service provider 110 through the network 130. This configuration is capable of flexibly supporting trusted partners within an enterprise, and also supporting affiliated partners of varying enterprises.

In one embodiment, the user/browser 140 is communicatively coupled to the central service provider 110 and the identity service provider 115 through a communication network 130. The current system 100 is capable of facilitating single sign-on functionality of the user to each of the entities within the network 120 of trusted partner sites. In another embodiment, the user is coupled directly to each of the clients within the network 120 of trusted partner sites.

Figure 2:
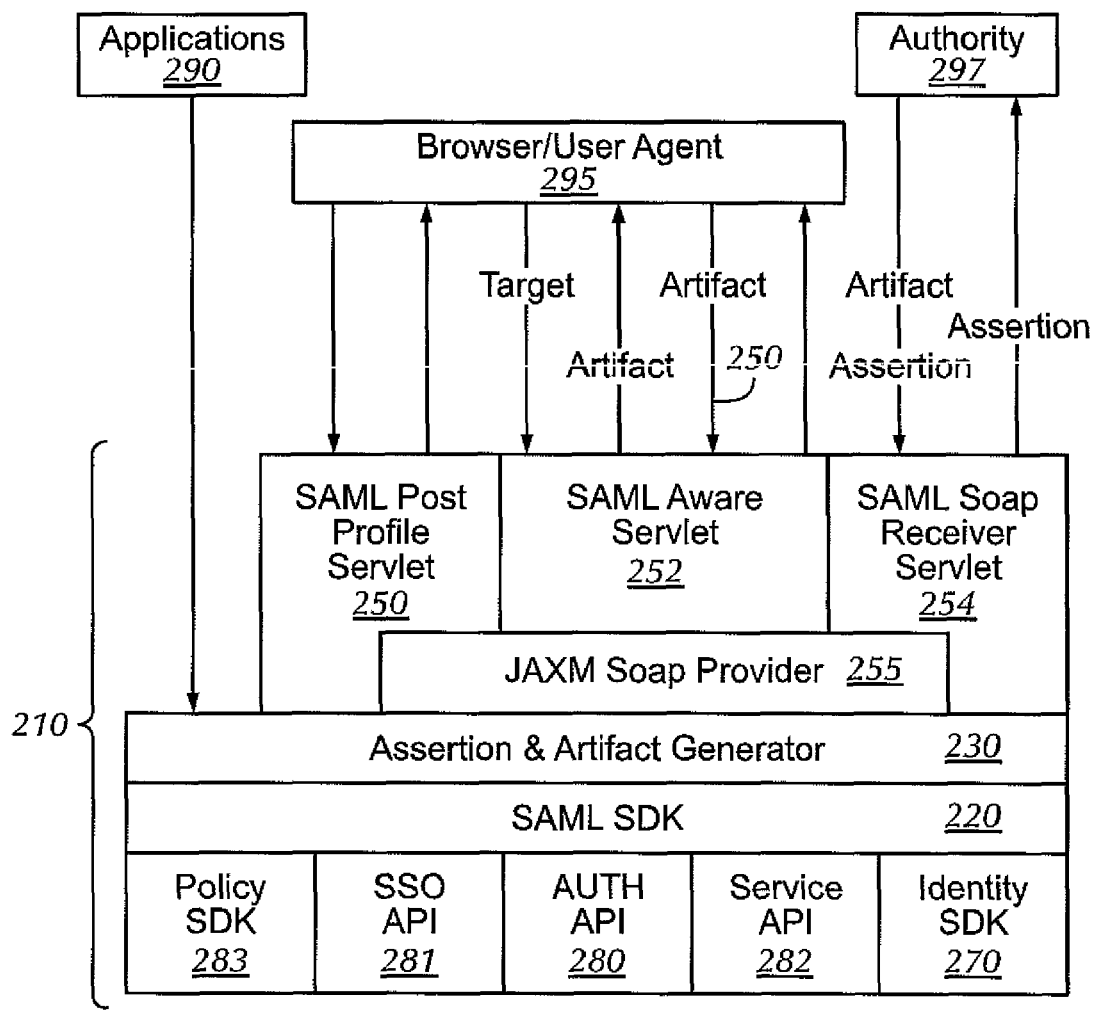
FIG. 2 is an architecture of a central service provider that provides identity services, and that is capable of supporting the transfer of assertion information between trusted partner sites in a network of trusted partner sites using artifacts, in accordance with one embodiment of the present invention.

Referring now to FIG. 2, a block diagram of the identity service provider 210 that is capable of supporting the transfer of information within a network of trusted partner sites (e.g., network 120) using artifacts is shown, in accordance with one embodiment of the present invention. The identity service provider 210 provides several application program interfaces (APIs), software development kits (SDKs), and various extensible markup language (XML) interfaces.

The identity service provider 210 provides identity services in the present embodiment. As such, the identity service provider 210 is supported by an identity SDK 270 that identifies and authenticates users of the network of trusted partner sites. Authentication methods implemented in the identity API range from a login based on user identifications and passwords to more sophisticated mechanisms like token, digital certificates, and biometrics.

In addition, an authorization API 280 provides information indicating whether a particular user or entity is authorized to access some, all, or none of the various trusted partner sites in the network. Authorization occurs after a user is identified and authenticated. The identity service provider 210 can then grant permission to access applications and services.

In particular, the identity service provider 210 coordinates the identity services for validating and authenticating users to the network of trusted partner sites. For example, the identity service provider 210 provides for an Internet browser based single sign-on (SSO) through a SSO API 281 used for authenticating users and issuing a single-sign-on token. The SSO is used to provide a mechanism by which users need to authenticate only once to the network of trusted partner sites, and is also used to access multiple Web-based applications.

In addition, the identity service provider 210 comprises a service API 282 and a policy SDK 283.

In one embodiment, the identity service provider 210 and communicates with each of the network of trusted partner sites using a protocol that is substantially compliant with the Security Assertion Markup Language (SAML) specification, or its derivatives. The SAML protocol is implemented within central service provider 110 through the identity service provider 210 using the SAML SDK module 220. The SAML Specification defines a common XML framework for exchanging XML defined assertions among the partners in the network of trusted partner sites. As such, the network of trusted partner sites and the identity service provider 210 are capable of exchanging information in an interoperable manner across different vendor platforms within the network of trusted partner sites.

The SAML specification encompasses assertions, protocols, bindings and profiles, in accordance with one embodiment. Assertions contain information following the SAML and XML format. For example, authentication or identity assertions indicates whether a user has proven his or her identity to the identity service provider 210. Also, authorization decision assertions indicate whether a user is authorized to buy an item, or to access a particular trusted partner site. General information is also stored and transferred in the form of assertions. The identity service provider is capable of generating assertions through the assertion and artifact generator 230. Assertions are stored in the server memory in one embodiment.

SAML protocols define the request and response messages used for communicating within the network of trusted partners and the identity service provider 210. The protocol is the way SAML requests and retrieves assertions using the Simple Object Access Protocol (SOAP) over the hypertext transport protocol (HTTP). The SMAL POST profile servlet 250, the SAL aware servlet 252, the SAML SOAP receiver servlet 254, and the JAXM SOAP provider provide the SAML SOAP functionality in the identity service provider 210.

Further, a set of bindings and protocols constitute a profile that specify how SAML request and response message exchanges are mapped to standard messaging protocols. For example, in one embodiment, the SAML POST profile servlet 250 specifies how the SAML requests and responses are exchanged to communicate with various browsers 295, such as those browsers associated with users or other trusted partner sites. In another embodiment, the hypertext transport protocol (HTTP) binding describes how request and responses are exchanged using HTTP when communicating with security authorities 297. In particular, the "Browser/POST Profile" in SAML describes how requests and responses are exchanged using HTTP POST and hypertext markup language (HTML) forms through the use of a web browser. In another embodiment, a SOAP profile defines the method implemented for requesting and receiving assertions within the network of trusted partner sites and the identity service provider 210 using the SOAP profile.

In one embodiment, the identity service provider 210 transfers assertion information through the use of artifacts. The identity service provider 210 is capable of generating artifacts that are associated with specific information using the assertion/artifact generator 230.

In addition, various applications 290 are integrated into the identity service provider 210 for added functionality. These various applications 290 are provided outside the environment of the central service provider. The applications 290 can be provided for use by the identity service provider 210.

Figure 3A:
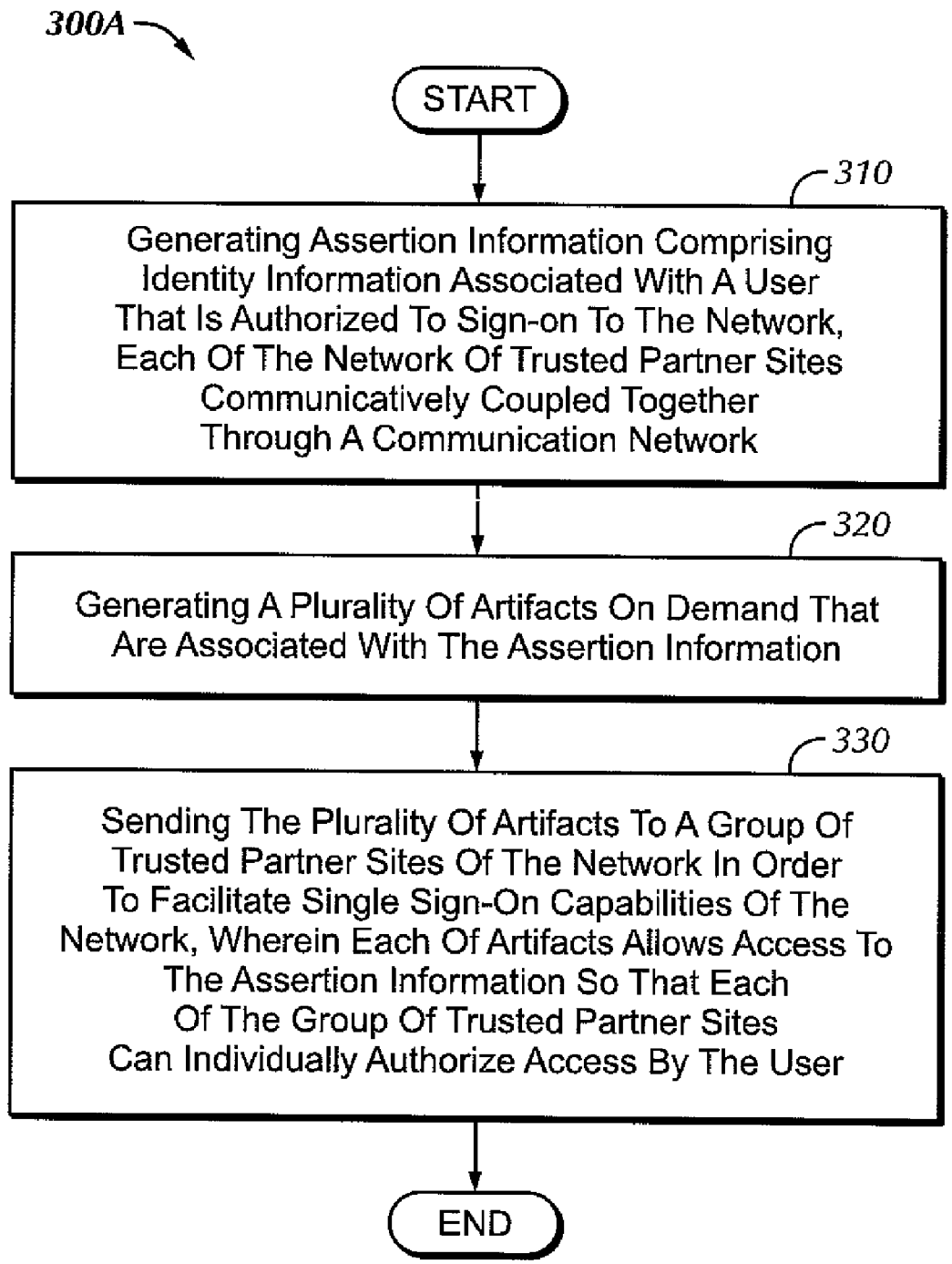
FIG. 3A is a flow chart illustrating steps in a computerized method for the generation of assertion information, an associated artifact in support of the transfer of identity assertion information between trusted partner sites in a network of trusted partner sites using artifacts, in accordance with one embodiment of the present invention.

FIG. 3A is a flow chart 300A illustrating steps in a computer implemented method for transferring identity information within a network of trusted partner sites to facilitate single sign-on capabilities, in accordance with one embodiment of the present invention. The network of trusted partner sites is comprised of affiliated entities that are serviced by a single central service provider. A communication network communicatively couples the network of trusted partner sites and the central service provider.

The central service provider supports identity services for the network of trusted partner sites. For example, the identity services include authentication and authorization services, as previously described. With the use of the central service provider, the network of trusted partner sites facilitates user web profile single sign-on capabilities. As such, a user of the network of trusted partner sites need only authenticate itself once to the central service provider, and thereafter need not re-authenticate itself when interacting with the various trusted partners of the network.

The present embodiment begins by generating assertion information that comprises identity information associated with a user, at 310 of flow chart 300A. The generation of the assertion information is performed by the central service provider in the present embodiment. However, other embodiments of the present invention are well suited to generation of assertion information by entities other than the central service provider, such as, a trusted partner site.

Previously, the user had been authorized to sign-on to the network of trusted partner sites. For example, as will be described in full in relation to FIG. 5, the central service provider receives a sign-on request from the user to access one of the network of trusted partner sites. The sign-on request contains user identification (user id) information, such as, user name and password. The central service provider then can access more detailed identity information associated with the user. This identity information can be used initially by the central service provider to authenticate the user, and allow the user to sign-on to the network. At this point, the user is authorized access to the network as a whole based on the identity information, and not to individual trusted partner sites, unless the trusted partner site authorizes the central service provider to perform authorization services pertaining to that trusted partner site.

Once the user is authenticated to sign-on to the network of trusted partner sites, the user need not sign on again to either the network as a whole, or to the individual trusted partner sites. Instead, further authorization granting access by the user to each of the trusted partner sites is performed transparently to the user through the use of artifacts by the individual trusted partner sites.

At 320 of flow chart 300A, the present embodiment generates a plurality of artifacts that are associated with the assertion information. These artifacts, when properly authenticated by the central service provider, allow the presenter of the artifact, again with proper authentication, access to the assertion information. The artifacts are generated on demand.

At 330, the present embodiment continues by sending the plurality of artifacts to a group of trusted partner sites of the network of trusted partner sites. The user desires access to each of the group of trusted partner sites. Transparently to the user, each of the group of trusted partner sites is capable of using the artifact to access the assertion information that contains identity information associated with the user. In that way, each of the group of trusted partner sites can individually determine whether to grant access by the user.

The user may expressly desire access to one of the group of trusted partner sites. For example, as described previously, the user initiated a sign-on to the network of trusted partner sites by desiring access to a single trusted partner site. Thereafter, the user desires access to another trusted partner site either to continue a transactional relationship, or to begin a new transactional relationship.

The plurality of artifacts is associated with assertion information stored at a location that is accessible by the central service provider. In one embodiment, the assertion information is stored at the central service provider. The artifact and the assertion information comply substantially with the open industry SAML specification, or its derivatives, to allow for the access and transfer of the assertion information within the network of trusted partner sites within an interoperable framework supported by different security domains and infrastructures, as well as applications implemented by the various entities within the network of trusted partner sites.

In one embodiment, the central service provider generates artifacts in a one-to-one relationship with the associated assertion information, the artifact, and the intended trusted partner site that receives the artifact. Measures are implemented within the artifact to provide a more secure mechanism for the storage and transfer of the assertion information. For instance, the artifacts are generated for a one-time use. In that way, once an artifact is presented for access to information, assuming the artifact has been authenticated and authorized for use by the presenter of the artifact, and after the assertion information is sent or accessed to the presenter, the useable life of that particular artifact is retired. This is possible, since the central service provider both generates the artifact for assertion information and controls access to the assertion information using known artifacts. Access to assertion information using false artifacts is denied.

Furthermore, as a further security measure, the central service provider also generates and attaches a wrapper or tag to the artifact, in one embodiment. The wrapper indicates to which trusted partner site the artifact is associated with. As such, only the assigned and associated trusted partner site can present that particular artifact to receive the associated assertion information.

Figure 3B:
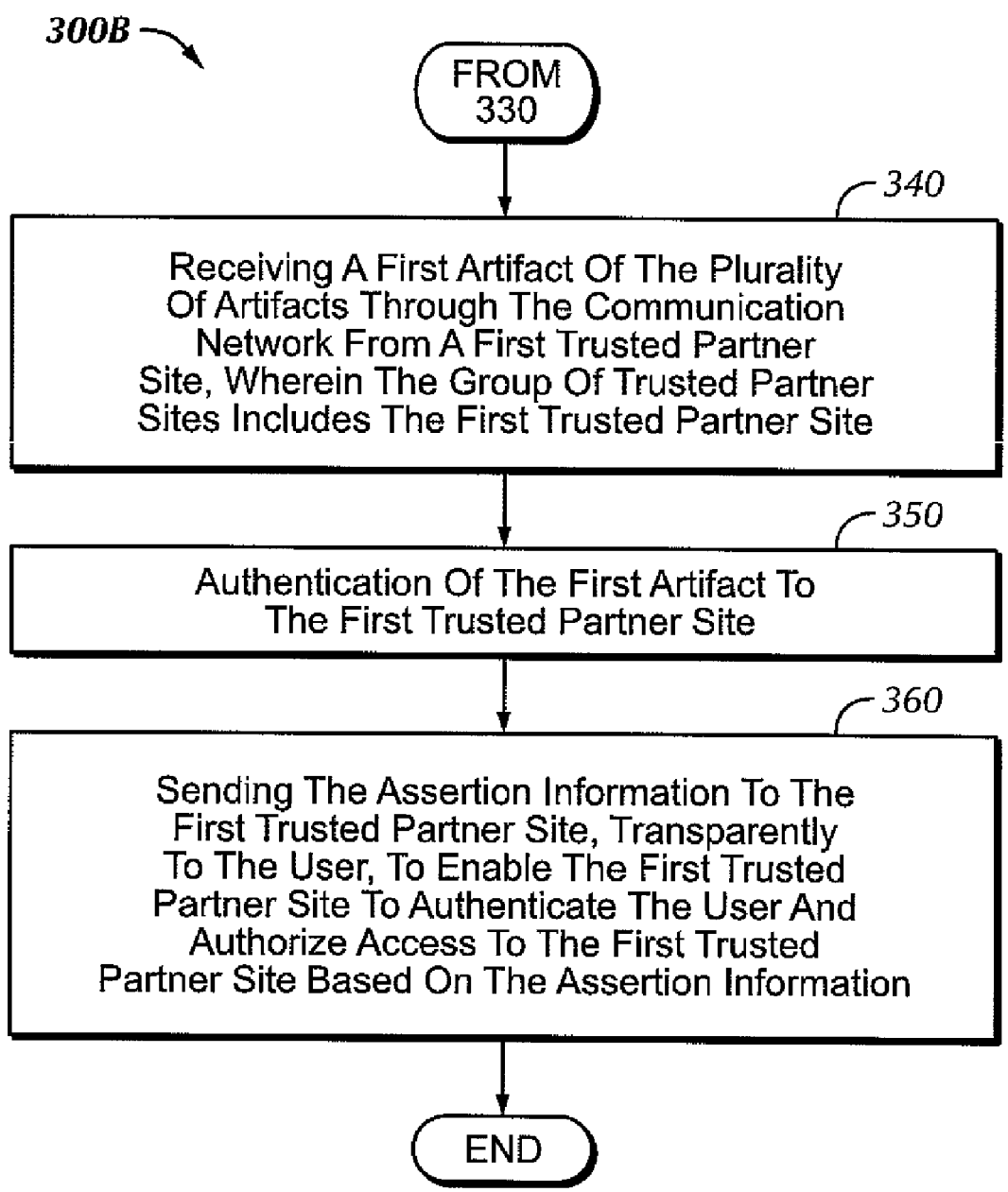
FIG. 3B is a flow chart illustrating steps in a computer implemented method for the transfer of assertion information to a trusted partner site from a central service provider through the use of artifacts, in accordance with one embodiment of the present invention.

Referring now to FIG. 3B, a flow chart 300B is disclosed illustrating steps in a computer implemented method for transferring identity information between affiliated trusted partner sites of a network using artifacts, in accordance with one embodiment of the present invention. The flow chart 300B is a continuation of the flow chart 300A, in one embodiment.

The present embodiment begins from 330 of FIG. 3A by receiving a first artifact through the communication network from a first trusted partner site. The first artifact is received by the central service provider. The first artifact originally was generated by the central service provider and is included within the plurality of artifacts.

The first trusted partner site, as the holder and presenter of the first artifact, desires to authenticate the user, and determine whether to grant access by the user to the first trusted partner site. This authentication is determined based on the assertion information associated with the first artifact.

In and embodiment, the first trusted partner site is one of the group of trusted partner sites. This implies that the first artifact was sent to the first trusted partner site from the central service provider. In another embodiment, the first trusted partner site is not one of the group of trusted partner sites. This implies that the first artifact was received by the first trusted partner site directly from the central service provider. Instead, a second trusted partner site that previously has access to the assertion information, has sent the first artifact to the first trusted partner site.

At 340, the present embodiment authenticates the first artifact. That is, the central service provider determines whether the first artifact is valid. This is possible, since the first artifact was originally generated by the central service provider, and as such, the central service provider can determine wither the first artifact is a valid artifact.

In one embodiment, the first artifact is associated with the first trusted partner. As discussed previously, this one-to-one relationship is implemented by a wrapper designating an association between assertion information, the first artifact, and the first trusted partner. In this case, the central service provider would verify and authenticate that the first artifact is valid and the presenter of the artifact is the first trusted partner site. As such, the central service provider can determine whether the first artifact was presented by the first trusted partner. If either proves false, then the assertion information would not accessible to the false presenter of the artifact.

In another embodiment, as long as the first artifact is valid, and presented by one of the network of trusted partners, then the central service provider would grant access to the assertion information.

At 360 of FIG. 3B, the present embodiment sends the assertion information to the first trusted partner site. This whole process is accomplished transparently to the user. Once the user has signed on to one of the network of trusted partner sites, it appears to the user that no other authorizations are needed to access other trusted partner sites. However, transparent to the user, further authentication procedures are implemented by each of the trusted partner sites to determine whether the user is granted access.

As such, once the first trusted partner site has received the assertion information, another authorization process is implemented individually by the first trusted partner site, transparent to the user. In this way, the first trusted partner site is able to individually authenticate the user and authorize access to the first trusted partner site based on the assertion information.

Figure 4:
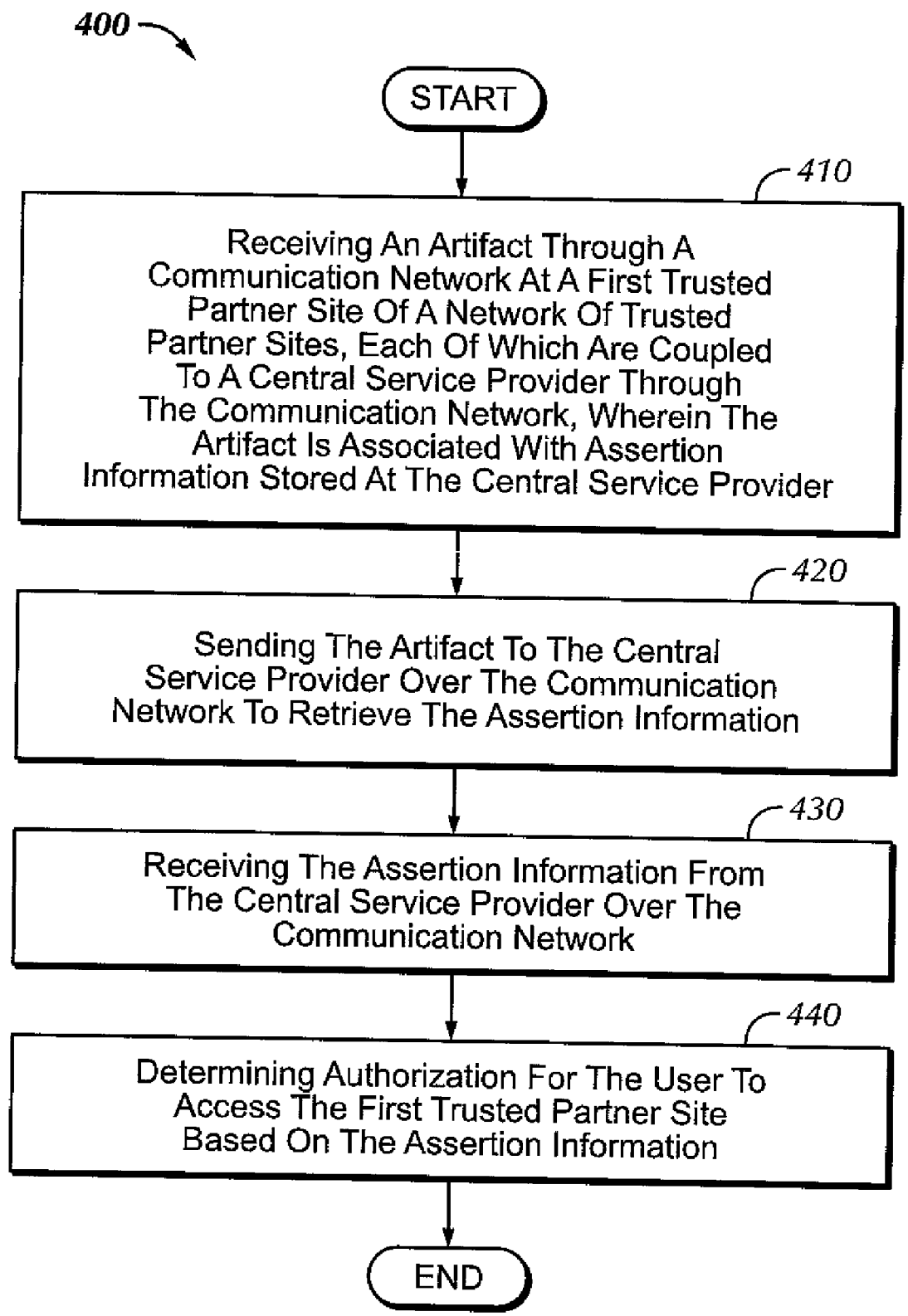
FIG. 4 is a flow chart illustrating steps in a computerized method for the request and receipt of assertion information by a trusted partner site in a network of trusted partner sites through the use of an artifact, in accordance with one embodiment of the present invention.

Referring now to FIG. 4, a flow chart 400 is disclosed illustrating steps in a computer implemented method for transferring information through the use of a central service provider and artifacts is disclosed, in accordance with one embodiment of the present invention. The central service provider provides services to a network of trusted partner sites. As described previously, the network of trusted partner sites is comprised of affiliated entities are serviced by the central service provider that provides identity services for the network of trusted partner sites. With the use of the central service provider, the network of trusted partner sites facilitates user web profile single sign-on capabilities.

The network of trusted partner sites is coupled together through a communication network, such as, the Internet, or local area network (LAN), etc. Access to the network of trusted partner sites is also through the communication network.

The present embodiment begins by receiving an artifact through a communication network, at 410. The artifact is received at a first trusted partner site, which is one of the network of trusted partner sites. The communication network couples each of the trusted partner sites to other partner sites and to the central service provider. As previously discussed, the central service provider supports the network of trusted partner sites in various capacities, to include, identity services (e.g., authentication and authorization services).

In one embodiment, the artifact is received at the trusted partner site from the central service provider. In another embodiment, the artifact is received at the trusted partner site from another trusted partner site. In that way, information stored at the central service provider is transferred from one trusted partner site to another trusted partner site.

In one embodiment, the information comprises identity information that is associated with the user. In another embodiment, the information comprises data. As such, the method as disclosed in flow chart 400 is used to facilitate the transfer of any type of information, such as, identity information, or data, between the trusted partner sites of the network of trusted partner sites.

The artifact is associated with assertion information stored at a location that is accessible by the central service provider. In one embodiment, the assertion information is stored at the central service provider. The artifact and the assertion information comply substantially with the open industry SAML specification, or its derivatives, to allow for the access and transfer of the assertion information within the network of trusted partner sites within an interoperable framework supported by different security domains and infrastructures, as well as applications implemented by the various entities within the network of trusted partner sites.

In one embodiment, the central service provider generates the assertion information. For example, the central service provider generates assertion information that indicates the identity of a user that is then transferred to various trusted partner sites by request for further authorization processing. In another embodiment, the central service provider stores assertion information that is received by the central service provider in the proper form. In this manner, the assertion information is stored at a location accessible by the central service provider for a predefined or indefinite period of time, until requested In another embodiment, the assertion information is generated at a remote location and sent to the central service provider for storage. In this case, the central service provider does not generate the assertion information, but takes the assertion information in the proper form, stores the assertion information, and transfers the assertion information as per direction. For example, a second trusted partner site generates the assertion information and transfers the assertion information to the first trusted partner site through the use of artifacts and the central service provider. Additionally, a second central service provider acting on behalf of itself or another trusted partner site within its own network of trusted partner sites is capable of generating the assertion information remotely and transferring the assertion information to the first trusted partner site through the use of the artifact and the central service provider.

In embodiments of the present invention, the assertion information comprises identity information to facilitate single sign-on capabilities to a network of trusted partner sites. As such, the identity information identifies a user or entity that is using or accessing information associated with the network of trusted partner sites. In other embodiments of the present invention, the assertion information comprises authorization information, such as, authorization to access various trusted partner sited within the network of trusted partner sites. In still other embodiments of the present invention, the assertion information comprises general information, or data, as described previously.

At 420 of flow chart 400, the present embodiment continues by sending the artifact to the central service provider over the communication network to retrieve the assertion information. More particularly, the first trusted partner site sends the artifact to the central service provider to determine whether the user can have access to the first trusted partner site, when implementing the single sign-on capability of the network of trusted partner sites. As such, access to the assertion information is controlled by following a predefined protocol using the artifact to retrieve the assertion information. As a result, a more secure means for storing and transferring information is achieved.

At 430 of flow chart 400, the present embodiment continues by receiving the assertion information from the central service provider over the communication network. This is accomplished after the central service provider authenticates the artifact and authorizes the presenter of the artifact access to the assertion information. After authentication and authorization, the central service provider sends the assertion information to the trusted partner site.

The assertion information is stored in a location that is accessible by the central service provider. In one embodiment, the assertion information is stored at the central service provider. In another embodiment, the assertion information is stored at a location remote to the central service provider.

At 440, the present embodiment determines whether or not to allow the user to access the first trusted partner site. As such, the first trusted partner site is able to use the artifact to access the assertion information stored to make a determination on whether or not to grant the user access authorization.

In one embodiment, the present embodiment continues by retiring or expiring the use of the artifact after the assertion information has been transferred to the first trusted partner site. In this way, the artifact generated and sent to the first trusted partner site to make information available to the first trusted partner site does not go to another location once the first trusted partner site has requested and received the assertion information.

In still another embodiment, the assertion information can still be transferred to other trusted partner sites. For example, the first trusted partner site may have need to transfer the source entity to a second trusted partner site within the network of trusted partner sites. Although the artifact associated with the identity assertion information is destroyed, the first trusted partner site can request a second artifact that is associated with the assertion information. As such, the central service provider would receive a request from the first trusted partner site for a second artifact associated with the assertion information. Then, the central service provider would generate the second artifact since it has already been verified that the first trusted partner site can access the assertion information. Thereafter, the central service provider would send the second artifact to a second trusted partner site as directed by said first trusted partner site.

Figure 5:
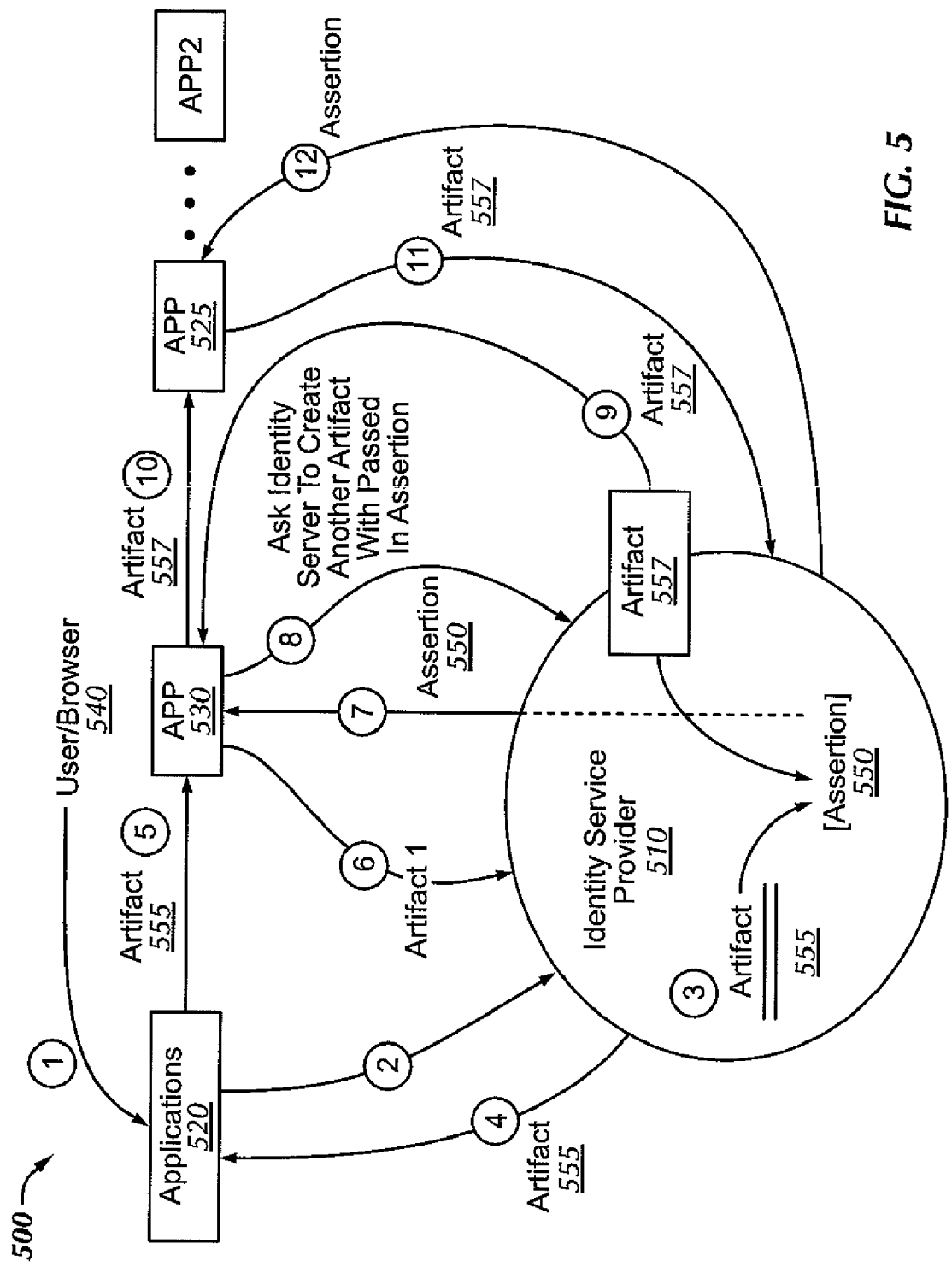
FIG. 5 is a data flow diagram illustrating the generation of assertion information internally within a network of trusted of trusted partner sites and the transfer of the assertion information within the network of trusted partner sites, in accordance with one embodiment of the present invention.

Referring now to FIG. 5, a data flow diagram 500 illustrating the internal generation of assertion information and associated artifacts are shown, in accordance with one embodiment of the present invention. The flow diagram 500 illustrates the transfer of information between a user/browser 540, application 525, application 530, on up to application n. all the applications are connected through the use of an identity service provider 510. The identity service provider 510 also includes a SAML service provider for the transfer of assertion information substantially complying with the SAML specification, or its derivatives. The applications 520, 525, and 530 are trusted partner sites of a network of trusted applications, or partner sites. A central service provider provides services for the network of trusted partner sites, one of which is the identity service as provided by the identity service provider 510.

The flow diagram is illustrative of a sign-on process identifying the user/browser 540 to the network of trusted partner sites that is supported by the identity service provider 510, in one embodiment. However, the flow diagram is also illustrative of the transfer of any type of information between trusted partner sites of a network of trusted partner sites, in other embodiments. The flow diagram 500 illustrates the web based single sign-on capabilities of the identity service provider that supports a network of trusted partner sites.

At step 1, the user authenticates to application 520. The sign-on process begins with the user/browser 540 sending user identification (user id) information and a password to the application 520 at step 1 to sign on and for authentication purposes.

At step 2, the user intends to visit a service provided by application 520. The application 520 sends the user id and the password to the identity service provider 510 in order to sign on with the network of trusted partner sites. The identity service provider 510 verifies and authenticates the user id and password.

At step 3, after verification and authentication of the user id and password, the identify service provider 510 generates a string of associated identity assertion information 550 that further identifies the user to each of the applications in the network of trusted partner sites. The assertion information 550 is generated internally by the identity service provider 510. This assertion information 550 is accessible by the identity service provider 510, and either stored locally within the identity service provider 510 or remotely.

The identity service provider 510 also generates an artifact 555 that is associated with the assertion information.

At step 4, the artifact 555 is transmitted to the application 520. As such, the user/browser 540 has authenticated itself with the application 520 in order to establish communication. Also, the artifact 555 promotes the single-sign-on capabilities for the user/browser 540 in the network of trusted partner sites.

Step 5 is an illustration of the single sign-on capability as supported by the identity service provider 510 to the network of trusted partner sites. At step 5, the application 520 is able to transfer access to the assertion information to application 530. For example, user/browser 540 may have need to continue conducting business within the network of trusted partner sites. In this case, the application 520 transmits the artifact 555 to the application 530.

At step 6, the application 530 asks the identity service provider 510 what the artifact 555 is used for. In one case, the application 530 can use the artifact 555 to transparently verify and authenticate the user id and password of the user/browser 540 transparently. At step 6, the application 530 sends the artifact 555 back to the identity service provider 510 in order to retrieve the assertion information 550 that identifies the user/browser 540. In this way, the application 520 is able to properly determine whether the user/browser 540 has proper access to the application 520.

At step 7, after properly verifying the validity of the artifact 555, and any other security measures as described previously (e.g., tag or wrapper), the identity service provider 510 locates and sends the assertion information 550 to the application 530. In this way, the user/browser 540 has provided a means for authenticating itself with the application 530, as an illustration of the single sign-on capabilities.

Since the application 530 is authorized access to the identity assertion information that identifies the user/browser 540, the application 530 is also granted the ability to request a second artifact 557 that is associated with the assertion information 550.

At step 8, the application 530 makes a request for the generation of a second artifact 557 that is sent to the identity service provider 510. Generation of the second artifact 557 is necessary since artifacts are good only for a one-time-use.

At step 9, the identity service provider 510 sends the second artifact 557 to application 530. In this way, the transfer of assertion information is transparent to the user/browser 540 enabling the web based single sign-on process.

At step 10, the application 530 is able to transfer access to the assertion information 550 to application 525. For example, user/browser 540 may have need to continue conducting business within the network of trusted partner sites. In this case, the application 530 transmits the artifact 557 to the application 525.

At step 11, once the application 525 has received the second artifact 557, the application 525 is able to make a request for the assertion information 550 by sending the second artifact 557 back to the identity service provider 510.

At step 12, after verification of the second artifact 557, the identity service provider 510 is able to send the assertion information 550 to the application 525. Thus, the application 525 has access to the assertion information 550 and can conduct an authorization process to determine whether the user/browser 540 can communicate with the application 525.

This process shown in FIG. 5 can be repeated for the various partner sites in the network of trusted partner sites. As such, the network of trusted partner sites as supported by the identity service provider is capable of performing a web based single sign-on that is transparent to the user/browser 540.

Figure 6:
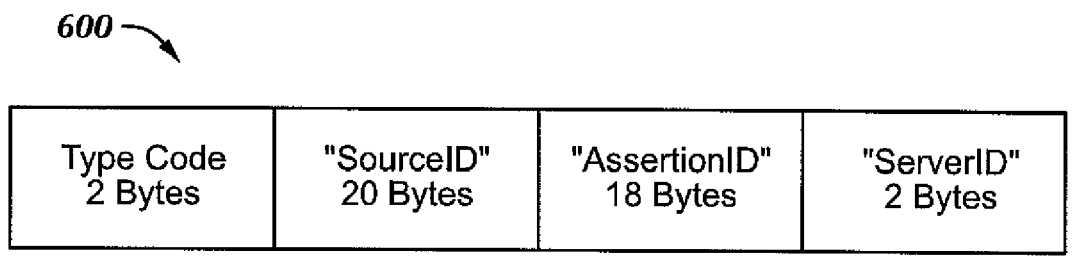
FIG. 6 is a diagram of an artifact, in accordance with one embodiment of the present invention.

FIG. 6 is a diagram illustrating an artifact 600, in accordance with one embodiment of the present invention. The artifact 600 comprises a type code 610. The type code 610 comprises the following format, "0X0001" for the SAML protocol. The type code 610 is comprised of 2 bytes of data.

The artifact 600 also comprises a source id 620. The source id 620 comprises an identifier of the artifact that is created. The source id 620 comprises 20 bytes of data.

The artifact 600 also comprises an assertion id 630. The assertion id 630 provides a reference id of the assertion which is associated with the artifact identified in the source id 620. The assertion id 630 comprises 18 bytes of data.

The artifact 600 also comprises a server id 640. The server id 640 is implemented when a load balancer is located between a client and the servers that generate the artifacts. As such, the server id identifies the real server which creates the artifact. In the case of a load balancer, the source id of all the load balanced servers are identical (the identifier to the load balancer), but the server id 640 provides the proper location for generating the artifact. Th server id comprises 2 bytes of data.

Figure 7:
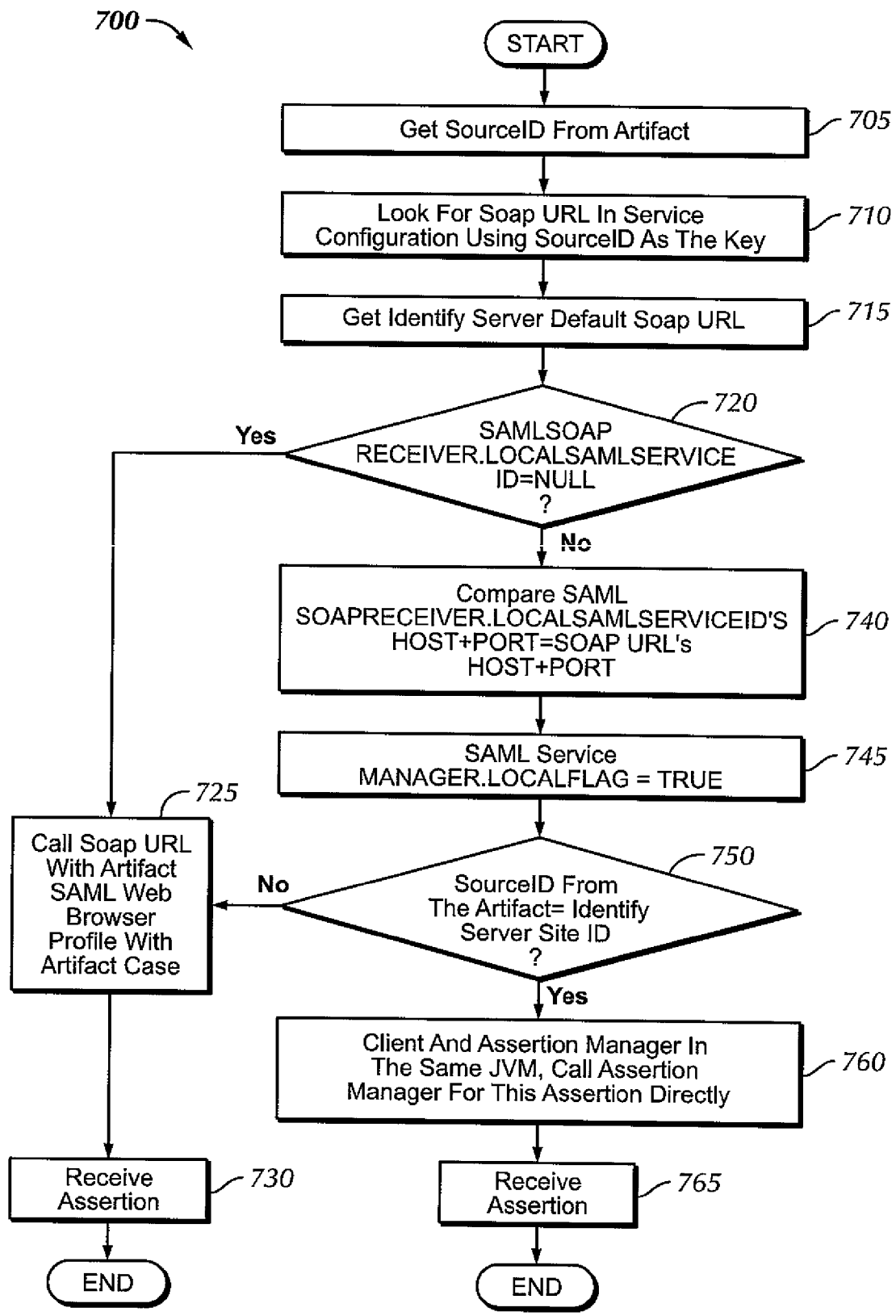
FIG. 7 is a flow chart illustrating steps in a computer implemented method for accessing assertion information through an internal assertion manager wen the central service provider and the client requesting ht assertion information are both hosted within the same web container, in accordance with one embodiment of the present invention.

Referring now to FIG. 7, a flow chart 700 illustrating steps in a computer implemented method for accessing assertion information through an internal assertion manager is shown, in accordance with one embodiment of the present invention. Access to the internal assertion manager for assertion information is only possible if the client and the central service provider supplying SAML services to the client are co-located on the same web container (e.g., JVM).

The present embodiment begins by retrieving a "source id" from an artifact, at 705. At 710, the present embodiment looks for the SOAP uniform resource locator (URL) in the service configuration using the "source id" as the key. If the SOAP URL is not found, the present embodiment proceeds to 715, retrieves an identity server default SOAP URL, and proceeds to 720. On the other hand, if the SOAP URL is found, then the present embodiment proceeds to 720.

When the SAMLSOAPREceiver servlet is deployed to a client site, it is part of a SAML service. However, the SAMLSOAPReceiver code is never executed at the client site. As such, the variable "localSAMLServiceID" is always null at the client site. Only when the client and the Assertion Manager of the server site are located in the same Java virtual machine (JVM), is a local flag turned true. That is, the variable "localSAMLServiceID" is not null. In that case, a short circuit can occur. That is, the Assertion Manager can be called directly to retrieve the assertion information associated with the artifact. Otherwise, retrieval of the assertion information is through the SOAP communication over the network.

At 720, the present embodiment determines if the variable "localSAMLServiceID" in the SAMLSOAPReceiver is null. The variable "localSAMLService ID" is null when initially defined, as described above. The SAML SOAP receiver is called and executed once.

As such, if the variable "localSAMLServiceID" is null, the present embodiment proceeds to 725. On the other hand, if the variable "localSAMLServiceID" is not null, the present embodiment proceeds to 740.

At 725, the present embodiment calls the SOAP URL using the artifact. That is, the present embodiment accesses the assertion information externally through communication with the central service provider. This is the case of a SAML web browser profile with artifact. Thereafter, an assertion is returned at 730.

On the other hand, if the "localSAMLServiceID" is not null, at 740, the present embodiment determines if the host port associated with the "localSAMLServiceID" is identical to the host port associated with the SOAP URL. Since the SAMLSOAPReceiver is a server site servlet, the variable "localSAMLServiceID" has a value only when the SAMLSOAPReceiver is located at the server.

At 745, if the "localSAMLServiceID" is identical to the host port associated with the SOAP URL, then a local flag is set to true.

Thereafter, at 750, the present embodiment determines if the "sourceid" from the artifact is identical to the identity server site id. If not, the present embodiment proceeds to 725, as previously described.

On the other hand, if the present embodiment determines that "sourceid" from the artifact is identical to the identity server site id, then the client and the assertion manager are located in the same Java virtual machine.

In this case, the client can communicate directly with the assertion manager without going through a central service provider to retrieve assertion information. As such, at 765, the assertion manager returns assertion information to the client.

Table 1 is an exemplary pseudo code for obtaining assertion information through a corresponding artifact, as follows. In addition, the pseudo code provides for determining whether a client is located internally within the same web container as the SAML service provider. If the client is co-located with the SAML service provider, then the pseudo code provides for setting a local flag as being true, and provides direct access to assertion information for the client.

TABLE 1

```
public static Assertion
getAssertionByArtifact (String artifact)
        throws IOException, SAMLException {
    if (artifact == null || artifact.equals("")) {
        if (SAMLUtils.debug.messageEnabled( )) {
                SAMUtils.debug.message("SAMLClient:
                    Input is null.");
        }
        throw new SAMLException(
            SAMLUtils.bundle.getString("nullInput"))
            ;
    }
}
// first, check if the source id contained in the
// artifact has an entry in SAML config
AssertionArtifact aa = new
    AssertionArtifact(artifact);.
String sid = aa.getSourceID( );
String ssurl = getSamlSoapUrl(sid);
// if not, query naming service to get the soap url
in case of local URL samlsoap = null;
try {
    if (ssurl == null) {
        Map instances= (Map)
            SAMLServiceManager.getAttribute(SAMLConst
            ants.INSTANCE-LIST);
        if (instances == null || instances.size( ) ==
            0) {
            throw new SAMLException(
                SAMLUtils.bundle.getString("instance
                    mapNull"));
        }
        String server= (String) instances.get(sid);
        if (server == null || server.equals("")) {
            throw new SAMLException(
                SAMLUtils.bundle.getString("instanceNotFo
                    und"));
        }
        URL serverurl = new URL(server) ;
        samlsoap = WebtopNaming.getServiceURL(
            SAMLConstants.SAML SOAP NAMING,
            serverurl.getprotocol( ) ~
            serverurl.getHost( ),
            Integer.toString(serverurl.getPort( )));
    } else {
        samlsoap = new URL(ssurl) ;
    }
    if (SAMLUtils.debug.messageEnabled( )) {
        SAMLUtils debug.message("SAMLClient: SOAPU
            rl="' + samlsoap.toString( ));
    }
} catch (URLNotFoundException ue) {
    SAMLUtils.debug.error("SAMLClient", ue);
    throw new SAMLException(
        SAMLUtils.bundle.getString("URLNotFoundEx
            ception"));
}
if (!setLocalFlag(samlsoap)) {
    throw new SAMLException(
        SAMLUtils.bundle.getString ("failSetLocalF
            lag"));
}
if (SAMLUtils.debug.messageEnabled( )) {
    SAMLUtils.debug.message ("SAMLClient:getAsserti
        onByArtifact: " +
        "check localFlag: " +
        SAMLServiceManager.localFlag);
String encodedSourceid = (String)
    SAMLServiceManager.getAttribute(
    SAMLConstants.SITE ID);
boolean isMySite =
    sid.equals(encodedSourceid.trim( )) ; -
if (SAMLServiceManager.localFlag) {
    // if the localFlag is true and the Artifact's
    // source id is the same as my site id, (means
    // SAMLClient and AssertionManager
    // in the same JVM, call AssertionManager
    // directly.
    if (isMySite) {
        if (SAMLUtils.debug.messageEnabled( )) {
```

TABLE 1-continued

```
            SAMLUtils.debug.message("SAMLClient:getAs
                sertionByArtifact" +
                ":call AssertionManager.getAssertion(" +
                "AssertionArtifact) ") ;
        }
        AssertionManager assertManager =
            AssertionManager.getInstance( ) ;
        Assertion assertion =
            assertManager.getAssertion(aa) ;
        return assertion;
    }
String[ ] strarray = new String [1] ;
strarray[O] = artifact;
List asserts = null;
if (isMySite && ssurl == null) {
    asserts = artifactQueryHandler (strarray,
        samlsoap.toString( )) ;
} else {
    asserts = artifactQueryHandler (strarray, null)
        ;
}
if (asserts == null] I asserts.isEmpty( )) {
    if (SAMLUtils.debug.messageEnabled( )) { . ,
        SAMLUtils.debug.message ("SAMLClient:getAs
            sertionByArtifact" +
            ":returned assertion list is null.");
    }
    return null;
}
return ((Assertion) asserts.get(O)) ;
}
private static String getSamlSoapUrl(String
    sourceid) {
    String soapurl = null;
    try {
        Map partner = (Map)
            SAMLServiceManager.getAttribute(
            SAMLConstants.PARTNER-URLS) ;
        if (partner == null) {
            SAMLUtils.debug.error("SAMLClient:Partner
                URL is null.") ;
            return null;
        }
        if (partner.containsKey(sourceid)) {
            SAMLServiceManager.SOAPEntry partnerdest
                = (SAMLServiceManager.SOAPEntry)
                partner.get (sourceid);
            soapurl = partnerdest.getSOAPUrl( ) ;
        } else {
            if (SAMLUtils.debug.messageEnabled( )) {
                SAMLUtils.debug.message("SAMLClient:
                    " + sourceid +
                    " is not on trusted site list.");
            }
        }
        return soapurl;
    } catch (Exception se) {
        SAMLUtils.debug.error("SAMLClient: ", se);
        return null;
    }
}
public static boolean setLocalFlag(URL url) {
if (url == null) {
    SAMLUtils.debug.error ("SAMLClient:setLocalFlag
        has null input.") ;
    return false;
}
try {
    if(SAMLUtils.debug.messageEnabled( )) {
        SAMLUtils.debug.message ("in
            setLocalFlag( ) , url : " +
            url.toString (>>;
        SAMLUtils.debug.message ("SAMLSOAPReceiver
            localSAMLServiceID : "
    }
    if (SAMLSOAPReceiver.localSAMLServiceID !=
        null {
        URL samlservice = new
            URL (SAMLSOAPReceiver.localSAMLServic
```

TABLE 1-continued

```
        eID);
    if ((url.getHost( )
            .equalsIgnoreCase(samlservice.getHos
            t( ))) &&
            (url.getPort( ) ==
                samlservice.getPort ( ))) {
        SAMLServiceManager.localFlag =
            true};
        return true; . . .
        }
    }
} catch (Exception e) {
    SAMLUtils.debug.error("SAMLClient:
        :setLocalFlag:: "
    return false;
}
SAMLServiceManager.localFlag = false;
return true;
}
```

While the methods of embodiments illustrated in flow charts 300, 400, and 800 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for transferring assertion information through the use of artifacts within a network of trusted partner sites, have been described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

What is claimed is:

1. A method for managing access to a plurality of applications using a central server, comprising:
receiving a user name and a user password of a user from a first application;
authenticating the user using the user name and password;
generating, in response to the successful authentication, identity assertion information comprising information associated with the user for use by a plurality of applications to authenticate the user;
generating a first artifact associated with the identity assertion information, wherein the first artifact is used to obtain the identity assertion information;
sending the first artifact to the first application;
receiving the first artifact and a request for the identity assertion information from a second application, wherein the second application receives the first artifact from the first application;
verifying the validity of the first artifact upon receipt from the second application;
retrieving, after successful validation of the first artifact, the identity assertion information for the user using the first artifact;
sending the identity assertion information to the second application, wherein the second application uses the identity assertion information to authorize the user to access the second application;
rendering the first artifact invalid for future use by any of the plurality of applications;
receiving a request for a second artifact from the second application; and
providing the second artifact associated with the identity assertion information, wherein the second artifact is used to obtain the identity assertion information,
wherein the first application and the second application are members of the plurality of applications.

2. The method of claim 1, further comprising:
receiving the second artifact and request for the identity assertion information from a third application, wherein the third application receives the second artifact from the second application;
verifying the validity of the second artifact upon receipt from the third application;
retrieving, upon successful validation, the identity assertion information for the user using the second artifact;
sending the identity assertion information to the third application, wherein the third application uses the identity assertion information to authorize the user to access the third application;
rendering the second artifact invalid for future use by any of the plurality of applications;
receiving a request for a third artifact from the second application; and
providing the third artifact associated with the identity assertion information, wherein the third artifact is used to obtain the identity assertion information,
wherein the third application is a member of the plurality of applications.

3. The method of claim 1, wherein the identity assertion information is stored in the central server.

4. The method of claim 1, wherein the first artifact comprises a type code, a source identification, and an assertion identification.

5. The method of claim 4, wherein the first artifact further comprises a server identification.

6. The method of claim 1, wherein the identity assertion information is generated in accordance with a Security Assertions Markup Language (SAML) standard.

7. The method of claim 1, wherein the user name and the user password are obtained by the first application from a web browser.

8. A system for managing access to a plurality of applications comprising:
a processor; and
an identity service provider executing on the processor, configured to:
receive a user name and a user password of a user from a first application;
authenticate the user using the user name and password;
generate, in response to the successful authentication, identity assertion information comprising information associated with the user for use by a plurality of applications to authenticate the user;
generate a first artifact associated with the identity assertion information, wherein the first artifact is used to obtain the identity assertion information;
send the first artifact to the first application;

receive the first artifact and a request for the identity assertion information from a second application, wherein the second application receives the first artifact from the first application;

verify the validity of the first artifact upon receipt from the second application;

retrieve, after successful validation of the first artifact, the identity assertion information for the user using the first artifact;

send the identity assertion information to the second application, wherein the second application uses the identity assertion information to authorize the user to access the second application;

render the first artifact invalid for future use by any of the plurality of applications;

receive a request for a second artifact from the second application; and provide the second artifact associated with the identity assertion information, wherein the second artifact is used to obtain the identity assertion information, wherein the first application and the second application are members of the plurality of applications.

9. The system of claim 8, wherein the identity service provided is further configured to:

receive the second artifact and request for the identity assertion information from a third application, wherein the third application receives the second artifact from the second application;

verify the validity of the second artifact upon receipt from the third application;

retrieve, upon successful validation, the identity assertion information for the user using the second artifact;

render the second artifact invalid for future use by any of the plurality of applications;

receive a request for a third artifact from the second application; and provide the third artifact associated with the identity assertion information, wherein the third artifact is used to obtain the identity assertion information, wherein the third application is a member of the plurality of applications.

10. The system of claim 8, wherein the identity assertion information is stored in the identity service provider.

11. The system of claim 8, wherein the first artifact comprises a type code, a source identification, and an assertion identification.

12. The system of claim 11, wherein the first artifact further comprises a server identification.

13. The system of claim 8, wherein the identity assertion information is generated in accordance with a Security Assertions Markup Language (SAML) standard.

14. The system of claim 8, wherein the user name and the user password are obtained by the first application from a web browser.

15. A computer readable memory comprising program instructions that, when executed by a processor, implement a method managing access to a plurality of applications using a central server, the method comprising:

receiving a user name and a user password of a user from a first application;

authenticating the user using the user name and password;

generating, in response to the successful authentication, identity assertion information comprising information associated with the user for use by a plurality of applications to authenticate the user;

generating a first artifact associated with the identity assertion information, wherein the first artifact is used to obtain the identity assertion information;

sending the first artifact to the first application;

receiving the first artifact and a request for the identity assertion information from a second application, wherein the second application receives the first artifact from the first application;

verifying the validity of the first artifact upon receipt from the second application;

retrieving, after successful validation of the first artifact, the identity assertion information for the user using the first artifact;

sending the identity assertion information to the second application, wherein the second application uses the identity assertion information to authorize the user to access the second application;

rendering the first artifact invalid for future use by any of the plurality of applications;

receiving a request for a second artifact from the second application; and providing the second artifact associated with the identity assertion information, wherein the second artifact is used to obtain the identity assertion information, wherein the first application and the second application are members of the plurality of applications.

16. The computer readable memory of claim 15, where the method further comprises:

receiving the second artifact and request for the identity assertion information from a third application, wherein the third application receives the second artifact from the second application;

verifying the validity of the second artifact upon receipt from the third application;

retrieving, upon successful validation, the identity assertion information for the user using the second artifact;

sending the identity assertion information to the third application, wherein the third application uses the identity assertion information to authorize the user to access the third application;

rendering the second artifact invalid for future use by any of the plurality of applications;

receiving a request for a third artifact from the second application; and providing the third artifact associated with the identity assertion information, wherein the third artifact is used to obtain the identity assertion information, wherein the third application is a member of the plurality of applications.

17. The computer readable memory of claim 15, wherein the identity assertion information is stored in the central server.

18. The computer readable memory of claim 15, wherein the first artifact comprises a type code, a source identification, and an assertion identification.

19. The computer readable memory of claim 15, wherein the first artifact further comprises a server identification.

20. The computer readable memory of claim 15, wherein the identity assertion information is generated in accordance with a Security Assertions Markup Language (SAML) standard.

21. The computer readable memory of claim 15, wherein the user name and the user password are obtained by the first application from a web browser.

* * * * *